(12) United States Patent
Cao et al.

(10) Patent No.: US 11,620,078 B2
(45) Date of Patent: Apr. 4, 2023

(54) APPARATUS AND METHODS FOR VARYING OUTPUT PULSE-WIDTH MODULATION (PWM) CONTROL OF AN INVERTER

(71) Applicant: NXP USA, Inc., Austin, TX (US)

(72) Inventors: Wei Cao, Suzhou (CN); Huan Mao, Suzhou (CN); Xiang Gao, Shanghai (CN); Dechang Wang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/449,749

(22) Filed: Oct. 1, 2021

(65) Prior Publication Data

US 2022/0113897 A1  Apr. 14, 2022

(30) Foreign Application Priority Data

Oct. 14, 2020  (CN) .......................... 202011097250.3

(51) Int. Cl.
*G06F 3/00*  (2006.01)
*G06F 3/06*  (2006.01)
*G06F 13/28*  (2006.01)

(52) U.S. Cl.
CPC ............ *G06F 3/0655* (2013.01); *G06F 3/061* (2013.01); *G06F 3/0673* (2013.01); *G06F 13/28* (2013.01); *G06F 2213/28* (2013.01)

(58) Field of Classification Search
CPC ........ G06F 3/0655; G06F 3/061; G06F 13/28; G06F 2213/28
See application file for complete search history.

(56) References Cited

U.S. PATENT DOCUMENTS 9,941,789 B2 * 4/2018 Bernardon ............... H03K 7/08
11,182,319 B1 * 11/2021 Huang .................. G06F 9/3877
(Continued)

FOREIGN PATENT DOCUMENTS

CN  207705871 U  8/2018

OTHER PUBLICATIONS

M.B. de R Correa, C.B. Jacobina, C.R. da Silva and A.M.N. Lima, "Reduced switch count dual-winding ac drive system with common-mode voltage mitigation," Twentieth Annual IEEE Applied Power Electronics Conference and Exposition, 2005. APEC 2005., 2005, pp. 458-464 vol. 1, doi: 10.1109/APEC.2005.1452975 (Year: 2005).*

(Continued)

*Primary Examiner* — Tammara R Peyton

(57) ABSTRACT

Apparatus and methods of providing digital varying output, such as sinusoidal, pulse width modulation, SPWM, control for an inverter comprising at least a first switch and a second switch are disclosed. The method comprising: generating a first binary control signal at a system modulation frequency; generating a second binary control signal at an M-times higher carrier frequency; wherein generating the second binary control signal comprises: providing a periodic counter having a K-times higher reset frequency; calculating M switch-off moments; determining for each, a corresponding switch-off counter value and a corresponding counter sequence value; storing each switch-off counter value in a respective memory location corresponding to the respective counter sequence and dummy values in the remaining memory locations; and sequentially and periodically transferring the contents of the memory locations to at least one PWM value register.

20 Claims, 9 Drawing Sheets

(56) References Cited

U.S. PATENT DOCUMENTS

2008/0310201 A1* 12/2008 Maksimovic .......... H03K 7/08
363/85
2017/0126119 A1   5/2017 Bernardon
2019/0305596 A1  10/2019 Mantha et al.

OTHER PUBLICATIONS

Kanike Vinod Kumar, Raju Saravanakumar; Title=Analysis of Switching Sequence Operation for Reduced Switch Multilevel Inverter With Various Pulse Width Modulation Methods Journal= Frontiers in Energy Research; vol. 7; Year=2020; DOI=10.3389/fenrg.2019.00164;ISSN=2296-598X (Year: 2020).*

Dominic, Jason. "Comparison and Design of High Efficiency Microinverters for Photovoltaic Applications." (2014). (Year: 2014).*

* cited by examiner

APPARATUS AND METHODS FOR VARYING OUTPUT PULSE-WIDTH MODULATION (PWM) CONTROL OF AN INVERTER

CROSS-REFERENCE TO RELATED APPLICATIONS

This application claims the priority under 35 U.S.C. § 119 of China application no. 202011097250.3, filed on 14 Oct 2020, the contents of which are incorporated by reference herein.

FIELD

The present disclosure relates to apparatus and methods for controlling an inverter. In particular it relates to pulse width modulation (PWM) control for such inverters, which may be used in applications such as wireless charging.

BACKGROUND

Inverters convert DC power to AC power. They are used in a wide range of applications. The controllers for such inverters typically use pulse width modulation (PWM) operating at a much higher frequency than the output frequency. One variant of PWM is so-called sinusoidal PWM (SPWM), in which the width of the pulses varies sinusoidally over the period of the output. The pulse width may also require to be adjusted "in real time" as the loading on the inductor changes. Of course the AC power may not be required to be purely sinusoidal, but might follow a horseshoe shape, that is to say an low-harmonic content-approximation to sinusoidal AC in which the voltage peaks are smoothly inverted, or trapezoidal waveform, that is to say a straight-line approximation to sinusoidal AC; the description below will refer to SPWM, but the disclosure extends to other waveforms of varying output PWM.

In some application the AC frequency may be relatively high—in this context that may be hundreds of kHz up to a few MHz. An example of such an application is wireless charging, in which the AC power is transferred by means of, typically, inductive coupling from a primary coil on the charger side, to a secondary coil on the charging side. In such wireless charging applications, the frequency of the AC power, also called herein the system modulation frequency, may be as high as 1 or 2 MHz.

The high frequency introduces challenges for SPWM control, and in particular for digital SPWM control.

SUMMARY

According to the first aspect of the present disclosure, there is provided a method of providing digital varying output pulse width modulation, PWM, control for an inverter comprising at least a first switch and a second switch, the method comprising: generating a first binary control signal at a system modulation frequency; generating a second binary control signal having a carrier frequency which is an integral multiple, M, of the system modulation frequency and a having periodically varying duty cycle; wherein generating the second binary control signal comprises: providing a periodic counter having a reset frequency which is an integral multiple K of the modulation frequency; calculating, in a first module, a plurality M of switch-off moments of the second control signal; determining, for each of the switch-off moments, a corresponding switch-off counter value and a corresponding counter sequence value; providing, in a second module, K memory locations; storing each switch-off counter value in a respective memory location corresponding to the respective counter sequence; storing a dummy value in each of the remaining memory locations; and sequentially and periodically transferring the contents of the memory locations to at least one PWM value register; the method further comprising, for one half of a period corresponding to the system modulation frequency: providing the first binary control signal to the first switch; and providing the second binary control signal to the second switch by reading the at least one PWM value register. Thereby, it may be possible to reduce the processing time or effort required to determine the correct moments to switch off the power switch or switches controlling the inverter.

In one or more embodiments, providing at least K memory locations comprises providing 2K memory locations; and the method further comprising: calculating, in the first module, a plurality M of switch-on moments of the second control signal; providing, in the second module, a further K memory locations; determining, for each of the switch-on moments, a corresponding switch-on counter value and a corresponding counter sequence value, and storing each switch-on counter value in a respective memory location corresponding to the respective counter sequence. It may thereby be possible to reduce the processing time or effort required to determine the correct moments to switch on the power switch or switches controlling the inverter In one or more embodiments, the K memory locations are part of a direct memory access, DMA, module, or the 2K memory locations are part of a direct memory access, DMA, module. By using a DMA module, it may be possible to further improve the process efficiency.

In one or more embodiments, the varying output PWM is sinusoidal PWM. This may be particularly useful since most AC waveforms are either sinusoidal or approximate to sinusoidal. However, in other embodiments the varying output of the AC waveform may have different, such as, without limitation, trapezoidal or triangular.

In one or more embodiments the integral multiple K is the Nth power of two, $2^N$. This may be particularly simple since in such embodiments the mapping of the M switch on and M switch-off moments may be one-to-one with K.

In one or more embodiments the method further comprises generating a third binary control signal and providing it to a third switch, and generating a fourth binary control signal and providing it to a fourth switch, wherein the third binary control signal is complementary to the first binary control signal, and the fourth binary control signal is complementary to the second binary control signal. This may facilitate one implementation of unipolar sinusoidal SPWM.

In one or more embodiments, the method further comprises for the other half of a period corresponding to the system modulation frequency: providing the first binary control signal to a first switch; providing the third binary signal to the fourth switch; quick providing the second binary control signal to a second switch by reading the at least one PWM value register; and providing the fourth binary signal to the third switch. This may facilitate another implementation of unipolar sinusoidal SPWM.

In one or more embodiments, periodically transferring the contents of the memory locations to at least one PWM value register comprises transferring the contents of four memory locations to a respective one of four PWM value registers, and subsequently transferring the contents of four other memory locations to the respective ones of the four PWM value registers. Such a step may make efficient use of DMA memory transfer.

In one or more embodiments, the step of determining, for each of the switching moments, a corresponding counter value and a corresponding counter sequence value is at least partly concurrent with the step of transferring the contents of four memory locations to a respective one of four PWM value registers.

In one or more embodiments the method may further comprise changing the frequency of the modulation frequency. Changing the frequency of the modulation frequency may enable frequency shift key, FSK communication between two devices, particularly in applications where the AC power is used for wireless charging of, for instance, an automobile or a communications device, and it is desired to provide communication between the charger and the charged device. Embodiments of the present disclosure may enable this in a convenient manner. In one or more embodiments, the method may further comprise frequency shift keying, FSK, encoding of data by changing a maximum counter value, at which the counter resets, thereby changing the frequency of the modulation frequency.

According to a second aspect of the present disclosure there is provided a controller for an inverter comprising a first switch and a second switch and configured to operate under varying output pulse width modulation by means of a first binary control signal at a system modulation frequency a second binary control signal having a carrier frequency which is an integral multiple, M, of the system modulation frequency and a periodically varying duty cycle to a second switch; the controller comprising: a counter module configured to provide a periodic counter having a reset frequency which is a multiple K times the modulation frequency; a first module configured to: calculate a plurality M of switch-off moments of the second control signal, and determine, for each of the switch-off moments, a corresponding counter value and a corresponding counter sequence value; a second module, comprising K memory locations, and arranged to store each counter value in a respective memory location corresponding to the respective counter sequence, and to store a dummy value in each of the remaining memory locations; least one PWM value register, arranged to periodically receive the contents of the memory locations; and an output arranged to be connected to the first switch and to control the switch by data in the at least one PWM value register.

In one or more embodiments, the first module is further configured to calculate a further plurality of K switch-on moments of the second control signal and to determine, for each of the switch-on moments, a corresponding counter value and a corresponding counter sequence value, and second module comprises a further K memory locations, and is arranged to store each counter value in a respective memory location corresponding to the respective counter sequence, and to store a dummy value in each of the remaining memory locations of the further K memory locations.

In one or more embodiments the second module is a Direct Memory Access, DMA, module. The integral K may be the Nth power of two, $2^N$.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
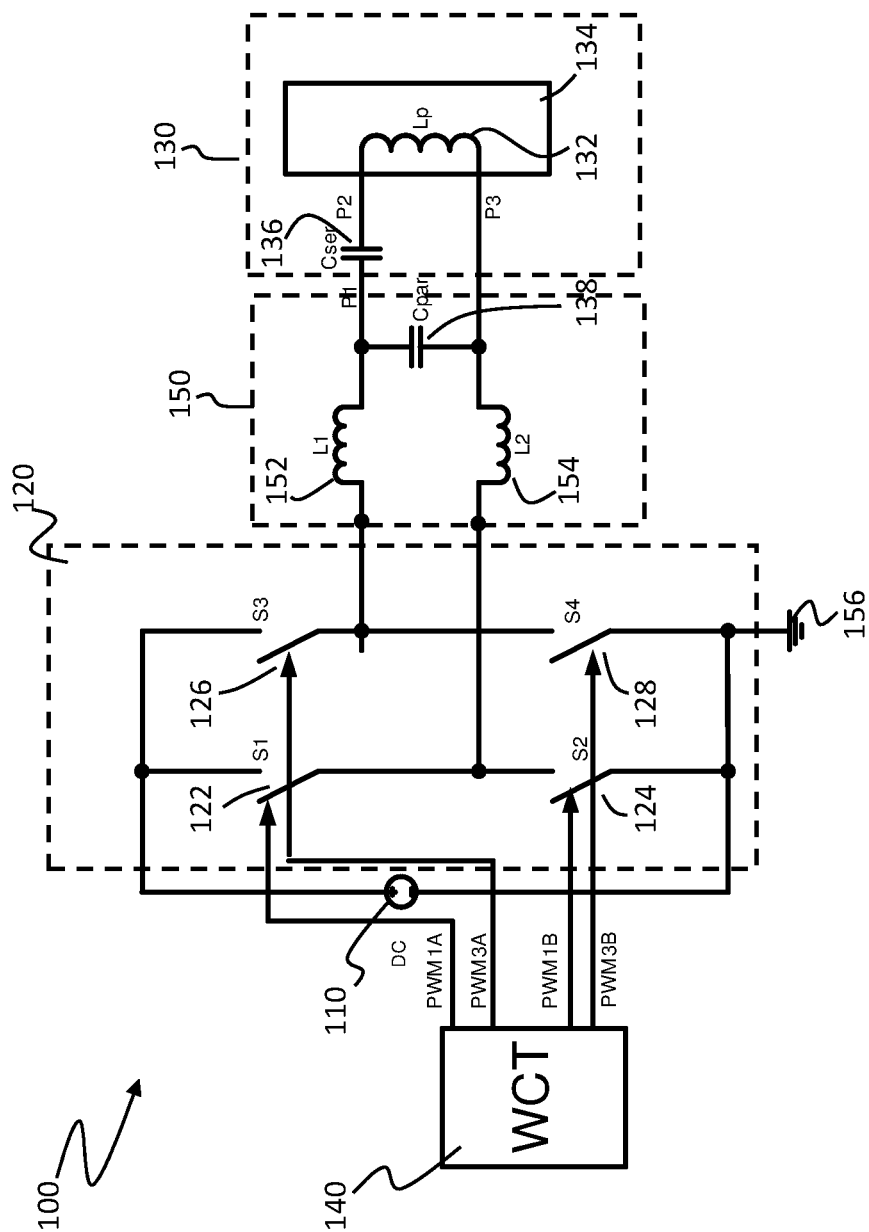
FIG. 1 illustrates, schematically, a wireless charging circuit and controller.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates, schematically, a wireless charging circuit and controller. The circuit 100 comprises a DC power supply 110, an inverter 120, PI filter 150 and a resonance circuit 130. The inverter comprises four switches, S1 122, S2 134, S3 126 and S4 128, arranged in a full bridge configuration. The PI filter comprises two inductive coils L1 152 and L2 154, a capacitance Cpar, 138. The two input connections on the input side of the full bridge are connected across the DC power supply 110; the two output connections on the output side of the full bridge are connected one to each of the two inductive coils L1 and L2. One side of the DC power supply 110 is connected to ground 156 and thus may be termed the "low-side". The other side may be termed the "high-side".

The inverter 120 is connected to drive the resonance circuit 130, through either L1 or L2 in dependence on the switching state of the inverter. The resonance circuit 130 comprises an inductance in the form of a charging coil Lp 132, which is on, or typically embedded in, a charging pad 134. The resonant circuit is completed by a series capacitance Cser 136. Each of the above-mentioned inductances and capacitance takes the form of one or more individual inductor or capacitors respectively.

Figure 2:
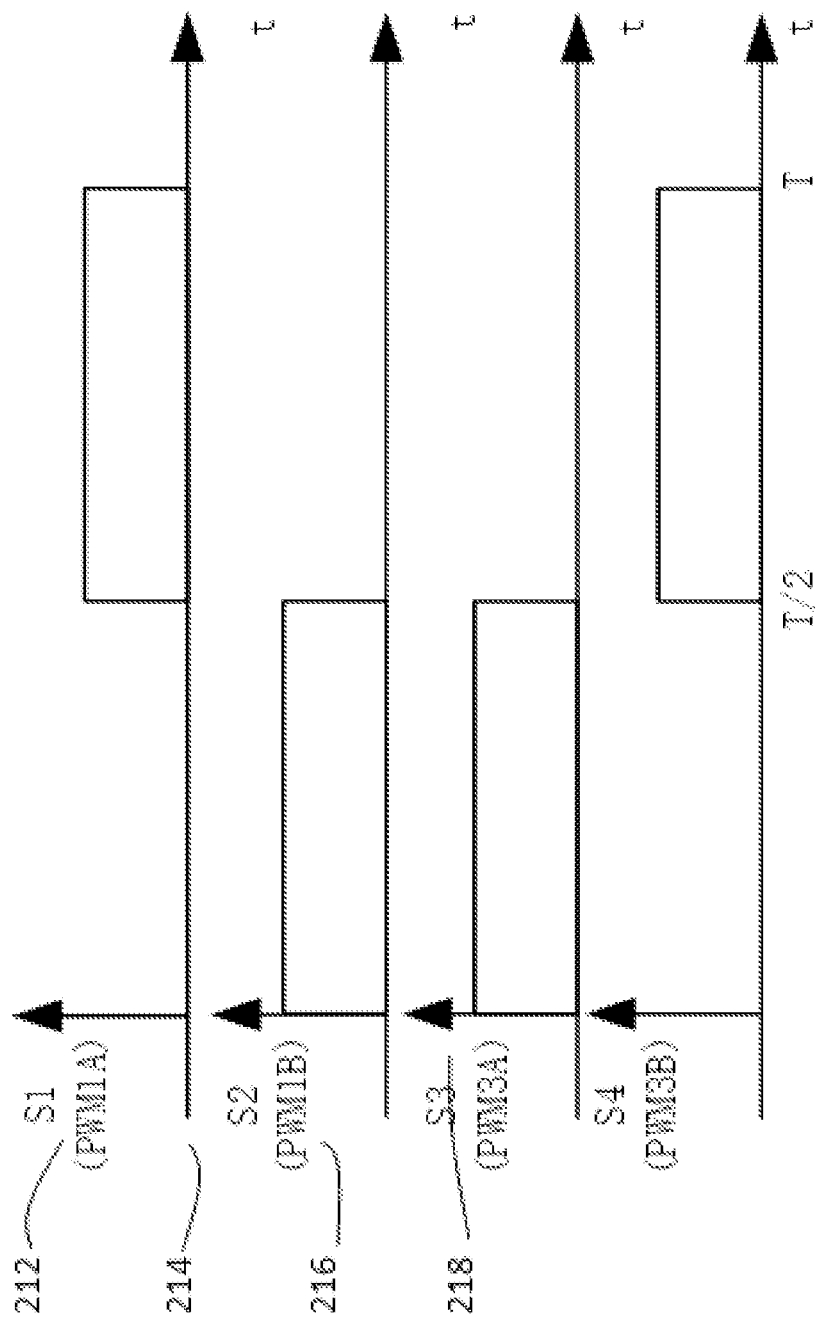
FIG. 2 illustrates basic PWM control operation of an inverter such as that in the circuit of FIG. 1.

The switches S1 to S4 are typically transistors such as FETs. The switches are controlled, for example by controlling the gates of each FET, using four control signals from a controller 140. Two of these, PWM1A and PWM3A control the high-side switches; the other two control switches, PWM1B and PWM3B control the low-side switches, Normal PWM control for an inductor such as that shown in FIG. 1 is illustrated in FIG. 2. In order to ensure that the DC power supply is never shorted to the ground, at any instance only one of S1 and S2 can be "on" or conducting and only one of S3 and S4 can be "on or conducting. Thus the control signal PWM1A 212 for switch S1 is arranged to be complementary to the control signal PWM1B 214 for switch S2. That is to say S1 is conducting whenever S2 is not conducting, and vice versa. Similarly the control signal PWM3A 216 for switch S1 is arranged to be complementary to the control signal PWM3B 218 for switch S2. That is to say S1 is conducting whenever S2 is not conducting, and vice versa.

The controller arranges for the switches to switch with a period T (and thus frequency 1/T); for a first part (or "pulse") of the switching cycle S1 is nonconducting and S2 is conducting; for the remainder of the switching cycle S1 is conducting and S2 is nonconducting. The PWM control is typically effected by adjusting the width of the first part or pulse whilst the switching cycle frequency or period is kept constant. Of course, given a fixed frequency, and a defined "on-time" of S2, it is not necessary that the "pulse" in S2 is at the start of each period—although for conventional PWM control that is generally used. Alternatively, the "pulse" could be at the end of the period. It could even occur during a middle part of the period—although this would require more complicated control, and so is typically not applied in conventional PWM. However, for sinusoidal PWM control such as that discussed hereinbelow, the "pulse" in S2 is, typically, not always at the start of the period, in order to maintain symmetry over a longer timescale (such as a "modulation period" as will be evident from the discussion hereinbelow relating to modulation frequency, and with reference to FIGS. 3 and 4).

The power supplied to the output depends on the width of the pulses, provided the DC power supply 110 supplies a fixed voltage. Thus, by sinusoidally varying the width of one or more pulses, it is possible to provide an AC output. This is illustrated in FIG. 3.

Figure 3:
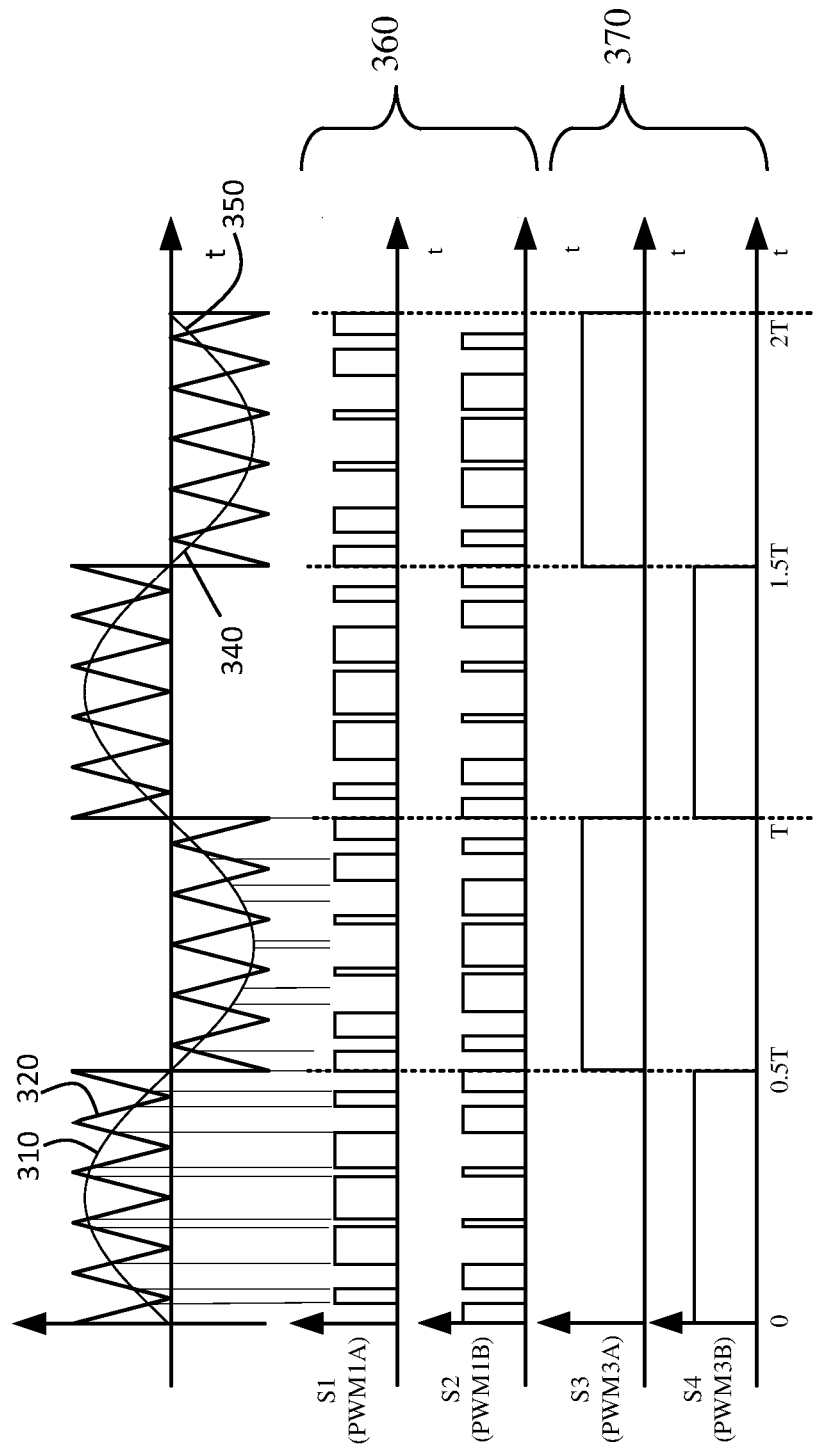
FIG. 3 illustrates SPWM control of an inverter such as that in the circuit of FIG. 1.

FIG. 3 illustrates switch control to provide an AC output by means of S PWM. In particular, control of switches S1 to S4 is shown in order to provide a sinusoidally AC output 310, also referred to as a modulating wave output. As shown, the modulation frequency of the output is 1/T. In this control, the switches S1 and S2 provide a so-called "high-frequency" half-bridge and switches S3 and S4 provide a "low frequency" half-bridge.

Consider first the high-frequency half-bridge. This half-bridge is switched using PWM control of a fixed frequency—in the illustrated example shown, this frequency is 10 times the modulation frequency, that the say the frequency is 10/T. The PWM frequency is also sometimes referred to as the "carrier frequency", and this is shown schematically in FIG. 3 by the triangular carrier wave 320.

It should be noted that the ratio between the modulation frequency and the carrier frequency is relatively small compared to inverters for other applications. Typically inverters providing mains frequency outputs (e.g. 50 Hz or 60 Hz) operate with carrier frequencies in the range of 10 kHz to a few hundred kHz, to provide mains frequency outputs—the ratio is then typically 200 to 2000. In contrast, in the shown example, which may be typical for an inverter providing an output having a modulation frequency of 100-200 kHz, the carrier frequency may be 1-2 MHz, and there are thus only five pulses of the PWM control for each half cycle of the modulation frequency.

As shown, the power supply to the output (and thus the height of the modulating wave) is proportional to the width of the conducting pulse in S1. Thus the width of the pulses could be calculated from the sinusoidal modulation curve (at time t according to $\sin(2\pi t/T)$.

However, a computationally simply method is shown, illustrated in FIG. 3. The triangular carrier wave is overlaid, that is to say compared with, the modulation curve: PWM1A is set to change state whenever the carrier wave crosses the much a location curve, (that is to say, the switch S1 is toggled between a conducting and a nonconducting state). And since the other switch—S2—in the half-bridge operates as the complement of S1 under control of PWM1B, this other switch toggles between a nonconducting and a conducting state. As a result, the voltage on the supply side of the inductor L2 is switched according to SPWM switching, in order to drive the resonant circuit of the wireless charger. These switching control signals are shown in the middle two curves 360

Also shown in FIG. 3 at the bottom two curves 370 are the control signals PWM3A for the third switch S3 and PWM3B for the fourth switch S4. These two switches form a second half-bridge, operated in 50% PWM at the relatively low frequency of the modulation curve. The relatively low switching frequency has the effect of periodically toggling the voltage on the input side of the inductor L1 between the supply voltage and ground, and enables the negative-going switching on negative side of the AC curve (that is to say the third and fourth quadrants 340 and 350).

Because, at any one time, the SPWM is applied to just one (S1 and S2) of the half bridges and not to the other half bridge (S3 and S4) this type of operation is called unipolar PWM operation.

Figure 4:
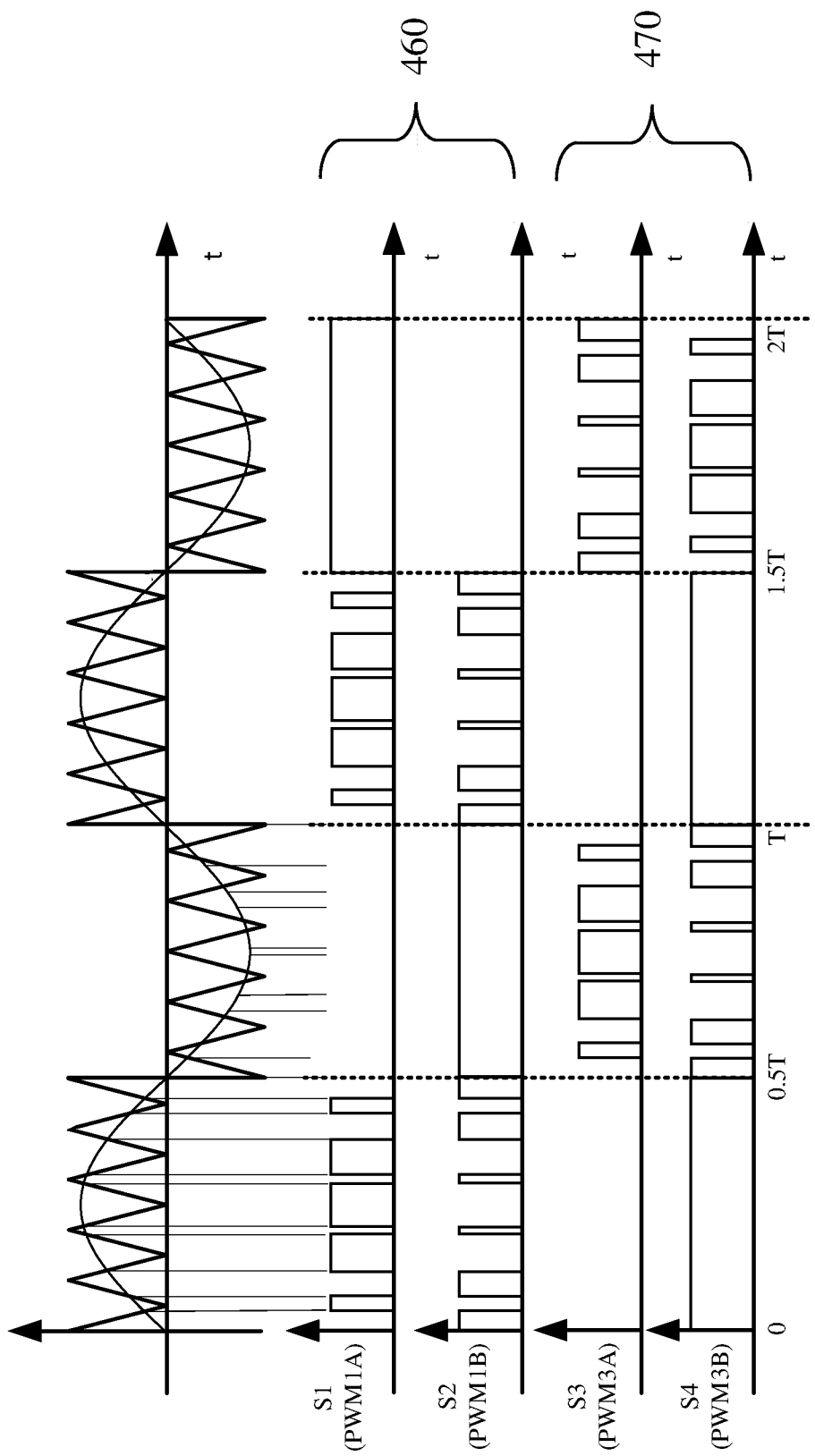
FIG. 4 illustrates an alternative configuration for SPWM control of an inverter such as that in the circuit of FIG. 1.

FIG. 4 shows an alternative driving arrangement for supplying unipolar SPWM. This configuration is broadly similar to that shown in FIG. 3, however instead of having a "relatively high frequency" bridge S1 and S2 and a "relatively low frequency" bridge S3 and S4, in this configuration the switches S1 and S2 are viewed as a "left bridge" and switches S3 and S4 are viewed as a "right bridge": in this configuration the left bridge S1 and S2 operates under SPWM control for the first two quadrants of the modulation curve, shown in the middle two curves 460, and the right bridge S3 and S4 operates under SPWM control for the third and fourth quadrants of the modulation curve, as shown in the bottom two curves 470. Thus, as can be seen from the figure, switches S3 and S4 are in low-frequency mode for the first two quadrants, and S1 and S2 are in low-frequency mode for third and fourth quadrant.

Each of the operating modes shown in FIG. 3 and FIG. 4 have in common that during any quadrant of the modulating curve, one pair of switches corresponding to a first half-bridge is operating in SPWM at the carrier frequency, and the other pair of switches corresponding to the other-half bridge is operating in simple PWM at the modulation frequency.

As shown in FIGS. 3 and 4, the PWM carrier wave is a symmetrical triangular waveform, having the PWM frequency. In practical digital SPWM implementations, this carrier wave may be implemented (digitally) by a counter, such as an up-down counter to produce a symmetrical triangular wave, such as the inverted triangular wave shown, or a saw-tooth (either up or down) counter which counts up or down to a maximum (or minimum) value and then resets at the start value. In practice, considering factor such as transferring data from memory to the PWM value registers, it is much simpler to implement counters such that the counter reset frequency is a power of 2 multiple (i.e. $2^N$) of the modulation frequency. However, restricting the PWM frequency to values which are a $2^N$ multiple of the modulation frequency is unduly limiting. The present inventors have appreciated an efficient method of control which relaxes this constraint.

Figure 5:
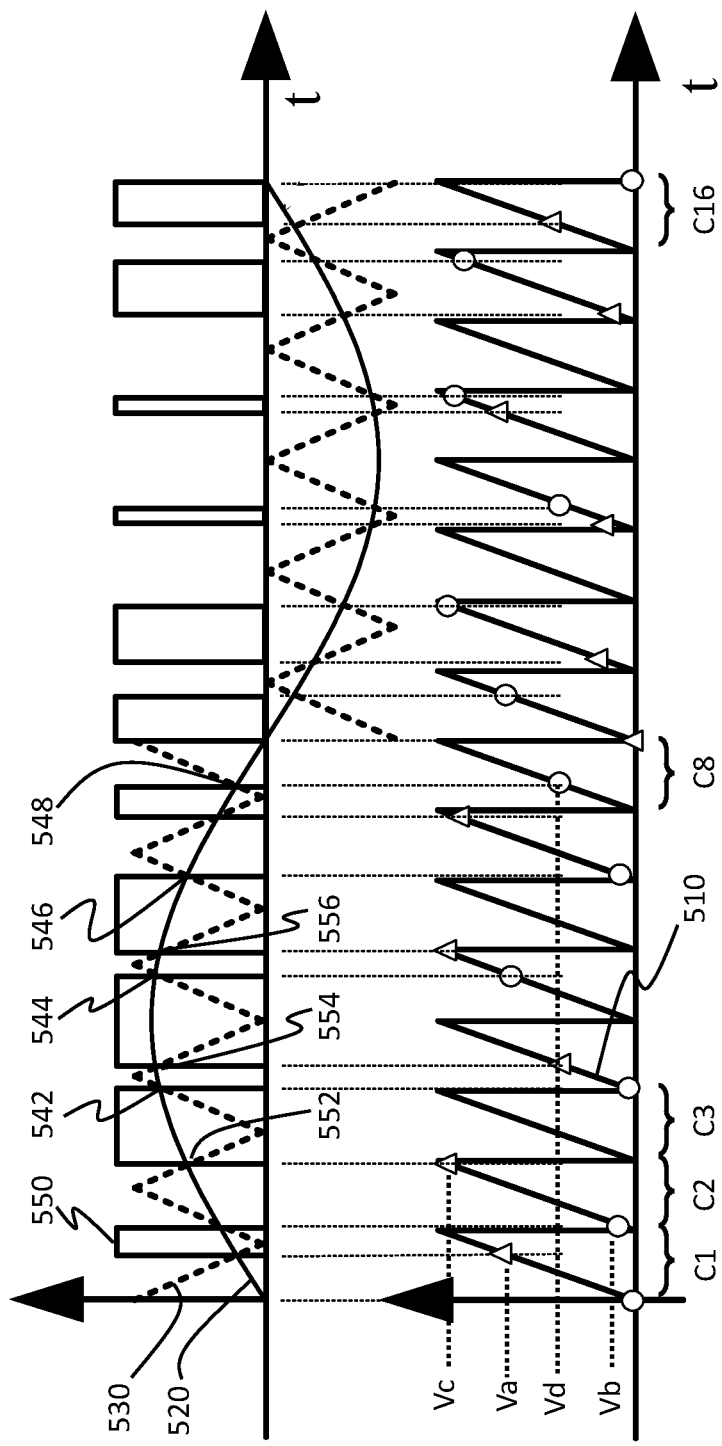
FIG. 5 illustrates, schematically, a method of providing a SPWM control, according to one or more embodiments.

The principle is illustrated with respect to FIG. 5.

The method provides digital sinusoidal pulse width modulation, SPWM, control for an inverter comprising at least a first switch S1 and a second switch S3. The method comprises generating a first binary control signal at a system modulation frequency, which corresponds the low-frequency PWM control, which has a fixed 50% duty cycle, and controls switch S3 for the complete modulation cycle as shown in FIG. 3; or it controls switch S3 for the first half of the modulation cycle and controls switch S1 for the second half of the modulation cycles, as shown in FIG. 4.

The method also generates a second binary control signal, such as PMW1A having a carrier frequency which is an integral multiple, M, of the system modulation frequency and a periodically varying duty cycle. For the unipolar SPWM shown in FIG. 3, this binary control signal controls switch S1 for the complete modulation cycle and thus directly corresponds to PWM1A in FIG. 3. For the unipolar SPWM shown in FIG. 3, the binary signal controls switch S1 during the first half of the modulation cycle and controls switch S3 for the second half of the modulation cycle as shown in FIG. 4 (so is a combination of PWM1A and PWM3A. The integer M may be 10, as shown in the FIG. 5; however, it is not constrained to this value and may have other values (such as 8, 9, 12 etc.). Note that it is not constrained to be a $2^N$ multiple such as 8 or 16.

To generate the second binary control signal, a periodic counter 510 is provided having a reset frequency which is an integral multiple K of the modulation frequency. Preferably, the reset frequency of the period counter is a $2^N$ multiple of the modulation frequency. Thus, as shown in FIG. 5, the integer K may have the value 16. As shown in FIG. 5, the period counter may be a saw-tooth (up) counter; however, in other embodiments it may be down counter or a symmetrical up and down counter.

A plurality M of switch-off moments of the second control signal are calculated. The calculation may be performed in a first module, which may be part of a microcontroller device. The switch-off moments are illustrated on the top part of FIG. 5: this top part of the curve overlays a sine wave 520 having the modulation frequency, and a symmetrical triangular up-down curve 530 having a frequency corresponding to the PWM frequency. It should be noted that in general the PWM frequency does not correspond to the reset frequency of the counter. Switch-off moments are shown at points such as 542, 544, 546, and 548 at which the triangular 530 curve crosses, upwardly, the sinusoidal modulation sine wave 520.

Optionally, according to one or more embodiments of the present disclosure, a further plurality M of switch-on moments for the second control signal are also calculated. Example switch-on moments are shown at 552, 554 and 556 and correspond to moments at which the triangular curve 530 crosses, in a downward trajectory, the sinusoidal modulation sine wave 510.

FIG. 5 also shows the resulting PWM control signal 550, which would result from the totality of the switch-on moments and switch-off moments.

Considering now the lower part of FIG. 5, the switch-off moments, and optionally the switch-on moments, can then be mapped on to the counter 510. As shown, the counter in this case has a frequency K times the modulation frequency, where K=$2^4$=16, and thus has a sequence of 16 triangular saw-teeth, shown as C1, C2, C3 etc. Any individual switch-off moment then corresponds to a specific counter value on a specific sequence number; for instance the first switch-off moment 542 corresponds to a counter Vb in counter sequence number C3. Similarly, the first switch-on moment 552 corresponds to a value of Va in counter sequence number C2. The corresponding switch-off counter value and a corresponding counter sequence value are thus determined, for each of the switch-off moments, and optional for each of the switch-on moments.

The respective counter sequence value for each switch-off moment is stored in memory, across K (that is to say in this case 16) memory locations. For fast retrieval, the memory locations will generally be a contiguous block. However, as can be noted from FIG. 5, and the fact that the PWM frequency is only 10 times that of the modulation frequency, whereas the counter reset frequency is 16 times that of the modulation frequency, some of the memory locations will not have a stored effective value from the counter: in other words the PWM control signal is not switched off at any point of that particular sawtooth.

So in each of the remaining memory locations of the K memory locations (that is to say for (K−M) locations), a dummy value is stored. The dummy value is chosen to be invalid, in the sense that it is outside of the PWM counter range, and thus will not take effect to change the PWM electrical level—for instance it may be a negative value. Thus, in embodiments in which only the switch off values are used, there is now stored in memory, for each value of the counter sequence (1-16 in this example), either a counter value corresponding to a switch-off control moment, or a dummy value if there is no switch-off control moment during that value of the counter sequence.

In embodiments in which the switch-on moments are also used in addition to the switch-off moments, a total of 2K memory locations are provided, in this instance, two locations for each value of the counter sequence. Again, in general for fast memory retrieval, the 2K relocations will be a contiguous block. In such embodiments, the switch-off moments are interleaved with the switch-on moments across the 2K memory locations. Again there will be (K−M) values of the counter sequence for which there is no switch on value, and a dummy value is stored in these locations.

There results a block of 2K memory locations, a pair of which correspond to each value C1, C2 etc. of the counter sequence. In each pair of memory location there may be a switch-on value and a dummy value (such as is the case for C1 showing Va, a switch-on value and a switch-off value (such as is the case for C2 showing Vc and Vb respectively), two dummy values (such as is the case for sequence value C3 shown) or a dummy value and the switch-off value (such as is the case for C8 showing Vd).

The contents of the memory locations are sequentially and periodically transferred to a pair of two PWM value registers, being one rising register and one falling register.

Thereby, a second binary control signal has been generated, thus implementing the SPWM control, and depending on the specific embodiment this is used to either control S1 throughout operation or to control S1 during a first half of the modulation cycle and S3 during a second half of the modulation cycle, as discussed above. It will be noted that if the SPWM illustrated in FIG. 4 is implemented, the PWM control for S3 during the second half of the modulation cycle shown in FIG. 5 is a copy of that supplied to S1 during the first half of the modulation cycle, and thus only the first half of the cycle need be implemented (for S2—and then repeated for the other switch S3.

In operation, the controller of the inverter reads the timing of switch-off moments for S1 (or S3 as appropriate) from the PWM value register, on a PWM cycle by cycle basis. The PWM value register thus is updated for each PWM cycle with the data from the memory locations in turn. In the example described above, in which both switch-on and switch-off control points are determined as described, two values, one from each of two of the contiguous block of memory locations are transferred into the PWM value register for each PWM cycle. At the end of that cycle the control values for the next cycle (being the next two adjacent points in the memory) are loaded into the value registers. Thus the values are sequentially transferred to the control register. Moreover, at the end of the counter sequence (that is to say after transferring the last power values which in the case shown would be for C16) the sequence is restarted such that the first power values (which may have been updated in the meantime), for C1, are transferred. Thus the values are periodically transferred in addition to being sequentially transferred.

Providing the control signals to the PWM value registers involves moving data from memory, as discussed above, and this takes a finite amount of time. For low-frequency inverters, this finite amount of time is a small fraction of the PWM cycle. However, as the frequency of inverters is increased, and in particular the PWM frequency is increased, the finite amount of time takes an increasing fraction of a PWM cycle, to the point where the processor is overloaded. The method described above may be an improvement on conventional control methodologies, since it may allow for the use of fast memory access. In particular memory access using so-called DMA (direct memory access) protocols may be used in one or more embodiments. In this case, the block of memory locations may be chosen to be specific "DMA" memory for which access is particularly fast relative to other types of random access memory (RAM).

Figure 6:
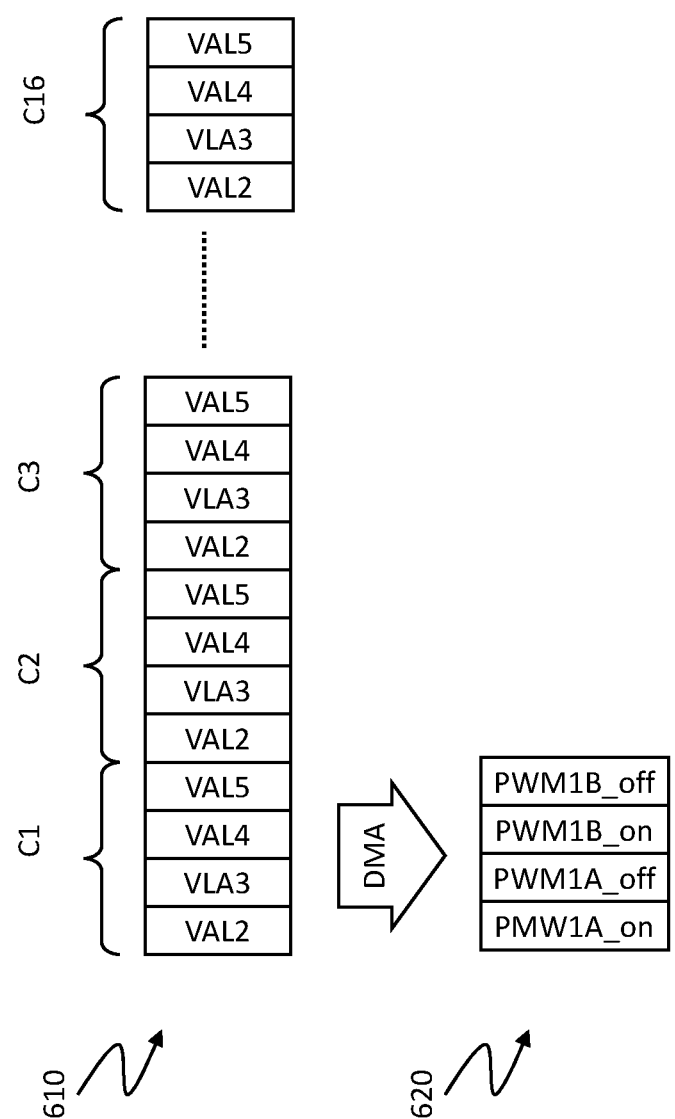
FIG. 6 illustrates DMA transfer between a block of memory and a set of PWM value registers.

An example of the process-efficient transfer of data is shown in FIG. 6. The figure shows a contiguous block of memory 610 locations, in which are stored, for each of the—in this case 16—values C1, C2, . . . C16 of the counter sequence, the switch-on and switch-off moments of the control signal PWM1A, along with dummy value or entry for values of the counter sequence for which there is no switch-on moment or switch-off moment, as described above with respect to FIG. 5. These control points (and dummy entries) for PWM1A are labelled as VAL2 and VAL3 in FIG. 6. Each memory location, e.g. VAL2 of C1, VAL3 of C1, etc. has the same size, which typically may be 4 bytes, although in other applications a different size of memory, such as 2 bytes or 8 bytes may be used. The figure also shows two additional memory locations, VAL4 and VAL5, for each counter sequence. These are the corresponding switch on and switch-off moments for the control signal PWM1B. As already discussed, control signal PWM1B is, at least during the parts of the modulation cycle during which PWM1A is implementing the SPWM control, approximately the complement of PWM1A. Thus, at least as far as the present disclosure is concerned, VAL5 may be a copy of VAL2, and VAL4 is a copy of VAL3. The skilled person will appreciate that, for some embodiments, an offset may be provided between the switching moments of PWM1A and PWM1B, in order to account for, for example, slew rates of FET switches to switch on and off; this is referred to as "dead time". And so, even under complementary operation of PWM1A and PWM1B, VAL5 may include an offset from VAL2, and VAL4 may include an offset from VAL3 Alternatively, VAL4 and VAL5 may not be used at all, but VAL2 and VAL3 may be the only PWM value registers used (in which case, the offset may be provided in a separate register) Alternatively, PWM1A and PWM1B may be controlled independently, which would require all four register VAL2, VAL3, VAL4 and VAL5. In this particular example, the contiguous block of memory comprises 16 groups of 4×4 bytes. In summary complementary mode may only require half the number of registers required for independent mode. In some embodiments, additional registers are required for determining the control of PWM3A and PWM3B. Alternatively, the PWM1A & PWM1B signals may be connected to the PWM3A and PWM3B ports by (for example) an internal cross-bar, in which cases additional registers are not required, Also shown in FIG. 6 is a group 620 of four registers which are value registers for the PWM switches, in particular for PWM1A and PWM1B. As just mentioned, this may be appropriate for embodiments in which the PWM1A & PWM1B signals are connected to the PWM3A and PWM3B ports.

This arrangement of memory is convenient as it allows for particularly efficient transfer of the data into the PWM value registers using a so-called Direct Memory Access, DMA, protocol. In a DMA protocol, systems interrupts, and the protection flags which are usually set and unset during reading or writing of data out of and into memory, or not used. The reading and writing operations may, as a result, be much faster than is typically the case for reading and writing from and to RAM, but there are constraints on what memory can be read/written (such as the contiguous block limitation/requirement already mentioned).

Thus, in embodiments of the present disclosure, the values for each counter sequence C1, C2 etc. are written in to the PWM value registers, one counter sequence at a time Applying the rules for DMA, the values are written in groups typically of 32 bits, that is to say 4 bytes, which results in one value being written at a time, VAL2, then VAL3, then VAL4 and finally VAL5. Another possibility for applying DMA is that the values are written in a single block of 16 bytes. At the end of each counter sequence (e.g. C2), the values corresponding to the next counter sequence (e.g. C3) are written again by DMA into the PWM value registers. After the values from C16 are written to the value registers, the cycle restarts with the values from C1 being written into the PWM value registers.

Figure 7:
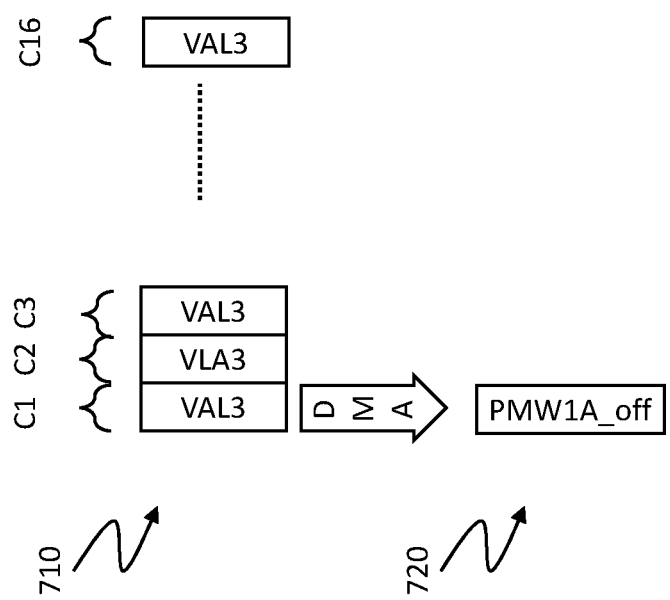
FIG. 7 illustrates another variant of DMA transfer between a block of memory and a set of PWM value registers.

Considering now FIG. 7, this represents a particularly simple embodiment, although as will be discussed, this embodiment has limited applicability: The figure shows a contiguous block of memory 610 locations, in which are stored, for each of the—in this case 16—values C1, C2, . . . C16 of the counter sequence, the switch-off moments of the control signal PWM1A, along with dummy value or entry for values of the counter sequence for which there is no switch-on moment or switch-off moment, as described above with respect to FIG. 5. These control points (and dummy entries) for PWM1A are labelled as VAL3 in FIG. 7. Each memory location has the same size, which typically may be 4 bytes, although in other applications a different size of memory, such as 2 bytes or 8 bytes may be used. In this embodiment, there are no other value registers. This is possible because of two limitations: firstly, PWM1A and PWM1B are operating in complementary mode (so there is no need for VAL4 and VAL5 registers); and secondly, the switch-on moment is at the start of the PWM period, which constrains M to be equal to K. Since according to the embodiments, M is constrained to equal K, is it of relatively limited use.

Figure 8:
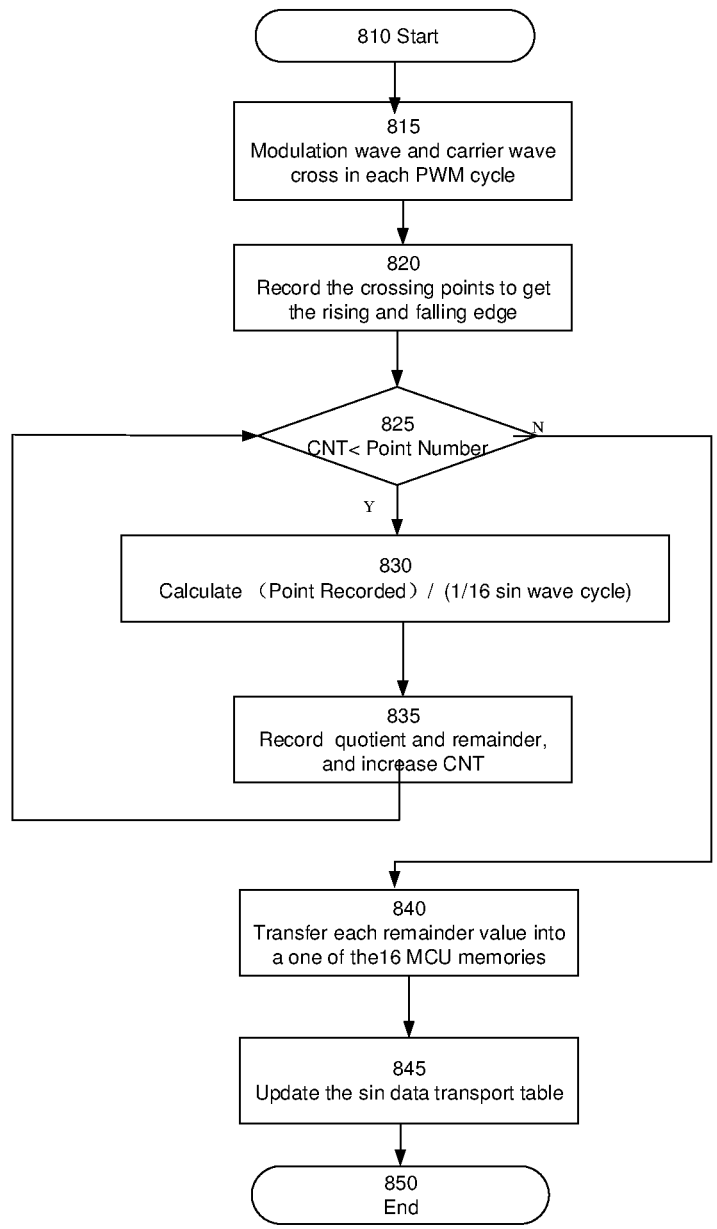
FIG. 8 shows a flowchart illustrating a method for determining the second binary control signal data.

Turning now to FIG. 8, this shows a flow diagram a method of determining the values for the memory 610, according to one or more embodiments.

The method starts at start step 810.

As shown at step 815 the modulation wave and carrier wave cross each other (typically for both a rising edge and falling edge of the control signal), in each PWM cycle.

At step 820 are recorded the crossing points to get the rising and falling edge (of the control signal). In other embodiments only the falling edge for each of the PWM cycles may be recorded.

At step 825 it is determined whether a count, CNT, is less than the number of points recorded. If yes, then control continues; if no, control jumps to step 840 mentioned hereinbelow.

At step 830, a calculation (Point Recorded/($\frac{1}{16}$ sin wave cycle) is made. This calculation results in a quotient and remainder. The quotient corresponds to the value of the counter sequence (i.e. in which triangle); the remainder corresponds to a counter value in that sequence (i.e. the position, that is to say how far up or down that particular triangle), the crossing occurred. And at 835, the quotient and remainder are recorded, and the count CNT is increased.

At step 840, each remainder value is transferred into a respective one of the MCU memories. Typically, as shown in FIG. 6, there are 16 such memories available for each of the rising edge and each of the falling edge. In one basic embodiments in which M=K, the rising edge may be always the start of the carrier period, which is a fraction $1/(2^N)$ (such as $1(2^4)=\frac{1}{16}$) of the modulation period, and only the falling edges are needed.

Optionally, at 845, a sine data transport table is updated, to change the working frequency or change the sine modulation wave amplitude to adjust the power transferred from Tx or RX per RX's requirements.

The method ends at step 850.

Figure 9:
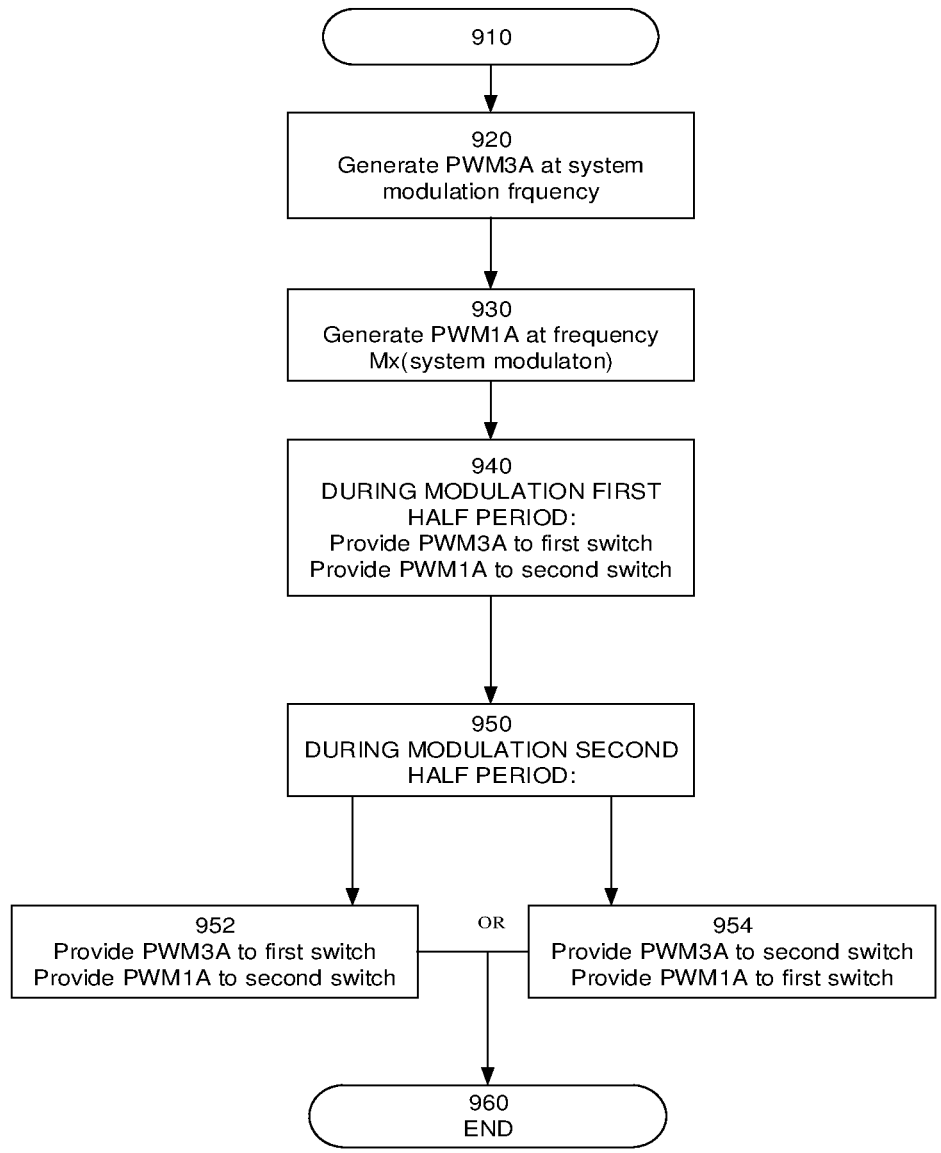
FIG. 9 shows a flowchart according to one or more methods of the present disclosure.

FIG. 9 shows an overview of method of providing digital sinusoidal pulse width modulation, SPWM, control for an inverter comprising at least a first switch (S3) and a second switch (S1), according to one or more embodiments of the present disclosure:

The method starts at step 910.

The method continues at step 920 with generating a first binary control signal (PWM3A) at a system modulation frequency.

The method continues at step 930 with generating a second binary control signal (PWM1A) having a carrier frequency which is an integral multiple, M, of the system modulation frequency. As discussed above, the second binary control signal has a periodically varying duty cycle.

This control signal is generated as shown in FIG. 8: by
providing a periodic counter having a reset frequency which is an integral multiple K of the modulation frequency;
calculating, in a first module, a plurality M of switch-off moments of the second control signal;
determining, for each of the switch-off moments, a corresponding switch-off counter value and a corresponding counter sequence value;
providing, in a second module, K memory locations;
storing each switch-off counter value in a respective memory location corresponding to the respective counter sequence;
storing a dummy value in each of the remaining memory locations;
sequentially and periodically transferring the contents of the memory locations to at least one PWM value register (620).

The method continues at step 940, for one half of a period corresponding to the system modulation frequency:
providing the first binary control signal to the first switch; and
providing the second binary control signal to the second switch by reading the at least one PWM value register.

As discussed hereinabove, in one or more embodiments switch-on moments are determined in addition to switch-off moments, and there are provided 2*K memory locations, being K for switch-off moments and dummy value, and a further K for switch-on moments and other dummy values.

The method continues at step 950, for the other half of the modulation period:
according to one or more embodiments, as shown at 952, continuing to provide the first binary control signal to the first switch, and to provide the second binary control signal to the second switch by reading the at least one PWM value register;
alternatively, according to one or more other embodiments, as shown at 954, the method
provides the first binary control signal to the second switch, and to
provide the second binary control signal to the first switch by
reading the at least one PWM value register.

The method ends at step 940.

From reading the present disclosure, other variations and modifications will be apparent to the skilled person. Such variations and modifications may involve other features which are already known in the art of digital SPWM control and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of providing digital varying output pulse width modulation, PWM, control for an inverter comprising at least a first switch and a second switch,
the method comprising: generating a first binary control signal at a system modulation frequency; generating a second binary control signal having a carrier frequency which is an integral multiple, M, of the system modulation frequency and a having periodically varying duty cycle;
wherein generating the second binary control signal comprises:
providing a periodic counter having a reset frequency which is an integral multiple K of the modulation frequency;
calculating, in a first module, a plurality M of switch-off moments of the second control signal;

determining, for each of the switch-off moments, a corresponding switch-off counter value and a corresponding counter sequence value;
providing, in a second module, K memory locations;
storing each switch-off counter value in a respective memory location corresponding to the respective counter sequence;
storing a dummy value in each of the remaining memory locations; and
sequentially and periodically transferring the contents of the memory locations to at least one PWM value register;
the method further comprising, for one half of a period corresponding to the system modulation frequency:
providing the first binary control signal to the first switch; and
providing the second binary control signal to the second switch by reading the at least one PWM value register.

2. A method as claim in claim 1,
wherein providing at least K memory locations comprises providing 2K memory locations;
the method further comprising:
calculating, in the first module, a plurality M of switch-on moments of the second control signal;
providing, in the second module, a further K memory locations;
determining, for each of the switch-on moments, a corresponding switch-on counter value and a corresponding counter sequence value, and
storing each switch-on counter value in a respective memory location corresponding to the respective counter sequence.

3. A method as claimed in claim 1 wherein the K memory locations are part of a direct memory access, DMA, module.

4. A method as claimed in claim 1 wherein the varying output PWM is sinusoidal PWM.

5. A method as claimed in any claim 1, wherein the integral multiple K is the Nth power of two, $2^N$.

6. A method as claimed in claim 1, further comprising generating a third binary control signal and providing it to a third switch, and generating a fourth binary control signal and providing it to a fourth switch, wherein the third binary control signal is complementary to the first binary control signal, and the fourth binary control signal is complementary to the second binary control signal.

7. A method as claimed in claim 6, further comprising,
for the other half of a period corresponding to the system modulation frequency:
providing the first binary control signal to a first switch;
providing the third binary signal to the fourth switch;
providing the second binary control signal to a second switch by reading the at least one PWM value register; and
providing the fourth binary signal to the third switch.

8. A method as claimed in claim 1, wherein periodically transferring the contents of the memory locations to at least one PWM value register comprises transferring the contents of four memory locations to a respective one of four PWM value registers, and subsequently transferring the contents of four other memory locations to the respective ones of the four PWM value registers.

9. A method as claimed in claim 8, wherein the step of determining, for each of the switching moments, a corresponding counter value and a corresponding counter sequence value is at least partly concurrent with the step of transferring the contents of four memory locations to a respective one of four PWM value registers.

10. A method as claimed in claim 1, further comprising changing the frequency of the modulation frequency.

11. A method as claimed in claim 1, further comprising frequency shift keying, FSK, encoding of data by changing a maximum counter value, at which the counter resets, thereby changing the frequency of the modulation frequency.

12. A controller for an inverter comprising a first switch and a second switch and configured to operate under varying output pulse width modulation by means of a first binary control signal at a system modulation frequency a second binary control signal having a carrier frequency which is an integral multiple, M, of the system modulation frequency and a periodically varying duty cycle to a second switch;
the controller comprising:
a counter module configured to provide a periodic counter having a reset frequency which is a multiple K times the modulation frequency;
a first module configured to:
calculate a plurality M of switch-off moments of the second control signal, and
determine, for each of the switch-off moments, a corresponding counter value and a corresponding counter sequence value;
a second module, comprising K memory locations, and arranged
to store each counter value in a respective memory location corresponding to the respective counter sequence, and
to store a dummy value in each of the remaining memory locations;
least one PWM value register, arranged to periodically receive the contents of the memory locations; and
an output arranged to be connected to the first switch and to control the switch by data in the at least one PWM value register.

13. A controller as claimed in claim 12,
wherein the first module is further configured to calculate a further plurality of K switch-on moments of the second control signal and to determine, for each of the switch-on moments, a corresponding counter value and a corresponding counter sequence value,
and the second module comprises a further K memory locations and is arranged to store each counter value in a respective memory location corresponding to the respective counter sequence, and to store a dummy value in each of the remaining memory locations of the further K memory locations.

14. A controller as claimed in claim 12, wherein the second module is a Direct Memory Access, DMA, module.

15. A controller as claimed in 12, wherein
the integral K is the Nth power of two, $2^N$.

16. The controller of claim 13, wherein the second module is a Direct Memory Access, DMA, module.

17. The controller of claim 14, wherein the first module and the DMA module are configured to transfer the contents of four memory locations to a respective one of four PWM control registers, and subsequently transfer the contents of four other memory locations to the respective ones of the four PWM control registers.

18. The controller of claim 12, further configured to encode data by Frequency Shift Keying, FSK, by changing the frequency of the modulation frequency.

19. A method as claimed in claim 4, wherein the sinusoidal PWM is unipolar SPWM.

20. A method of providing digital varying output pulse width modulation, PWM, control for an inverter comprising at least a first switch and a second switch, the method comprising:

generating a first binary control signal at a system modulation frequency;

generating a second binary control signal having a carrier frequency which is an integral multiple, M, of the system modulation frequency and having a periodically varying duty cycle;

wherein generating the second binary control signal comprises:

providing a periodic counter having a reset frequency which is an integral multiple K of the modulation frequency;

calculating, in a first module, a plurality M of switch-off moments of the second control signal;

determining, for each of the switch-off moments, a corresponding switch-off counter value and a corresponding counter sequence value;

providing, in a second module, K memory locations;

storing each switch-off counter value in a respective memory location corresponding to the respective counter sequence;

storing a dummy value in each of the remaining memory locations; and sequentially and periodically transferring the contents of the memory locations to at least one PWM value register;

the method further comprising, for one half of a period corresponding to the system modulation frequency:

providing the first binary control signal to the first switch; and providing the second binary control signal to the second switch by reading the at least one PWM value register.

* * * * *